United States Patent
Tomio et al.

(10) Patent No.: US 11,286,545 B2
(45) Date of Patent: Mar. 29, 2022

(54) CR-NI ALLOY AND SEAMLESS STEEL PIPE MADE OF CR-NI ALLOY

(71) Applicant: NIPPON STEEL CORPORATION, Tokyo (JP)

(72) Inventors: Akiko Tomio, Tokyo (JP); Masaki Ueyama, Tokyo (JP); Yusaku Tomio, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 16/962,299

(22) PCT Filed: Jan. 17, 2019

(86) PCT No.: PCT/JP2019/001361
§ 371 (c)(1),
(2) Date: Jul. 15, 2020

(87) PCT Pub. No.: WO2019/146504
PCT Pub. Date: Aug. 1, 2019

(65) Prior Publication Data
US 2020/0370151 A1 Nov. 26, 2020

(30) Foreign Application Priority Data
Jan. 26, 2018 (JP) .............. JP2018-011080

(51) Int. Cl.
*C22C 30/02* (2006.01)
*C22F 1/16* (2006.01)

(52) U.S. Cl.
CPC ........... *C22C 30/02* (2013.01); *C22F 1/16* (2013.01)

(58) Field of Classification Search
None
See application file for complete search history.

(56) References Cited

U.S. PATENT DOCUMENTS

| 4,421,571 A | 12/1983 | Kudo et al. |
| 9,175,360 B2 | 11/2015 | Hitoshio et al. |

| 2007/0181225 A1* | 8/2007 | Igarashi ............ C22F 1/10 148/410 |
| 2011/0236252 A1 | 9/2011 | Ueyama et al. |
| 2012/0195790 A1 | 8/2012 | Ueyama et al. |

FOREIGN PATENT DOCUMENTS

| EP | 3070184 A1 | 9/2016 |
| JP | 589924 A | 1/1983 |
| JP | 58210158 A | 12/1983 |
| JP | 62158844 A | 7/1987 |
| JP | 62158845 A | 7/1987 |
| JP | 62158846 A | 7/1987 |
| JP | 11302801 A | 11/1999 |
| JP | 2011063863 A | 3/2011 |
| WO | 2009119630 A1 | 10/2009 |

OTHER PUBLICATIONS

Koichi Nakajima, et al., "Evaluation method of dislocation density by use of X-ray diffraction", Current Advances in Materials and Processes (CAMP-ISIJ), The Iron and Steel Institute of Japan, 2004, vol. 17, No. 3, p. 396 (with translation).
G. K. Williamson and W.H. Hall, "X-Ray Line Broadening From Filed Aluminium and Wolfram," Acta Metallurgica, 1953, vol. 1, No. 1, p. 22-31.
H. M. Rietveld, "A Profile Refinement Method for Nuclear and Magnetic Structures," Journal of Applied Crystallography, 1969, vol. 2, p. 65-71.
ISR issued in Int'l. Application No. PCT/JP2019/001361, dated Mar. 19, 2019.

* cited by examiner

*Primary Examiner* — Brian D Walck
(74) *Attorney, Agent, or Firm* — Greer, Burns & Crain, Ltd.

(57) ABSTRACT

A Cr—Ni alloy having high yield strength and high resistance to sulfuric acid general corrosion at a high temperature of 250° C. is provided. The Cr—Ni alloy has a chemical composition consisting of, in mass %, Si: 0.01 to 0.50%, Mn: 0.01 to 1.00%, Cr: 21.0 to 27.0%, Ni: 40.0 to less than 50.0%, Mo: 4.5 to less than 9.0%, W: 2.0 to 6.0%, Cu: more than 2.0% and not more than 6.0%, Co: 0.01 to 2.00%, one or two kinds selected from the group consisting of Ca and Mg: 0.001 to 0.010% in total, sol. Al: 0.005 to 0.200%, N: 0.01 to 0.20%, and the balance being Fe and impurities. The dislocation density in the Cr—Ni alloy satisfies the following Formula (1):

$$8.00 \times 10^{14} \leq \rho \leq 2.50 \times 10^{15} + 1.40 \times 10^{14} \times [Cu+Co] \quad (1)$$

8 Claims, No Drawings

CR-NI ALLOY AND SEAMLESS STEEL PIPE MADE OF CR-NI ALLOY

This is a National Phase Application filed under 35 U.S.C. § 371, of International Application No. PCT/JP2019/001361, filed Jan. 17, 2019, the contents of which are incorporated by reference.

TECHNICAL FIELD

The present invention relates to a Cr—Ni alloy and a seamless steel pipe made of Cr—Ni alloy.

BACKGROUND ART

With the background of rise of consciousness about low-carbon energy, geothermal power generation has gained attention. In geothermal power generation, power is generated by steam taken out from a geothermal well deep in the earth. Especially in recent years, deeper geothermal wells than before has been developed. Therefore, alloy pipes etc. to be used in a deep geothermal well are required high yield strength (0.2% yield stress) to be able to withstand pressure in the earth.

Further, a deep geothermal well, in which the temperature is as high as not less than 250° C., contains corrosive substances. An example of such corrosive substance is sulfuric acid. A deep geothermal well contains a large amount of reducing acid such as sulfuric acid. In addition, the deep geothermal well contains corrosive substances such as hydrogen sulfide, carbon dioxide gas, and chloride ion. In other words, a deep geothermal well is in a severe corrosive environment (hereinafter, such environment of deep geothermal well is referred to as a "harsh geothermal environment").

Therefore, for the alloy pipes etc. to be used in a deep geothermal well, in addition to high yield strength, excellent corrosion resistance against such corrosive substances, particularly sulfuric acid is required. For example, in an environment containing a large amount of sulfuric acid, general corrosion by sulfuric acid is a dominant factor of corrosion. Therefore, for the alloy pipes, etc. to be used in a harsh geothermal environment, in addition to high yield strength, high resistance to sulfuric acid general corrosion at a temperature of 250° C. is required.

Conventionally, Cr—Ni alloys have been developed mainly for the purpose of applying them to oil wells. As conventional Cr—Ni alloys, for example, Japanese Patent Application Publication No. 58-210158 (Patent Literature 1), Japanese Patent Application Publication No. 58-9924 (Patent Literature 2), Japanese Patent Application Publication No. 11-302801 (Patent Literature 3), Japanese Patent Application Publication No. 62-158844 (Patent Literature 4), Japanese Patent Application Publication No. 62-158845 (Patent Literature 5), and Japanese Patent Application Publication No. 62-158846 (Patent Literature 6) are proposed. However, conventional Cr—Ni alloys have been directed for oil wells which contain a large amount of hydrogen sulfide ($H_2S$), not for deep geothermal wells which contain a large amount of sulfuric acid ($H_2SO_4$). For that reason, these alloys sometimes suffered from sulfuric acid general corrosion in a deep geothermal well containing a large amount of sulfuric acid.

On the other hand, a Ni-base alloy which exhibits excellent anti corrosion resistance in a corrosive environment such as a chemical plant where reducing acid such as sulfuric acid is contained is proposed in International Application Publication No. WO 2009/119630 (Patent Literature 7) and Japanese Patent Application Publication No. 2011-63863 (Patent Literature 8).

Patent Literature 7 proposes a Ni-base alloy which exhibits excellent corrosion resistance in a harsh corrosive environment containing reducing acid such as hydrochloric acid (HCl) and sulfuric acid ($H_2SO_4$). The Ni-base alloy of Patent Literature 7 contains, in mass %, C: not more than 0.03%, Si: 0.01 to 0.5%, Mn: 0.01 to 1.0%, P: not more than 0.03%, S: not more than 0.01%, Cr: not less than 20% and less than 30%, Ni: more than 40% and not more than 60%, Cu: more than 2.0% and not more than 5.0%, Mo: 4.0 to 10%, Al: 0.005 to 0.5%, and N: more than 0.02% and not more than 0.3%, and satisfies a Formula of $0.5Cu+Mo \geq 6.5$ ... (1), with the balance being Fe and impurities. Patent Literature 7 states that as a result of this, a Ni-base alloy which has corrosion resistance equivalent to a Ni-base alloy with a high Mo content such as Hastelloy C22 and Hastelloy C276, and also exhibits good machinability as well as low cost.

Patent Literature 8 proposes a Ni-base alloy having excellent corrosion resistance in an environment in which hydrochloric acid corrosion and/or sulfinic acid corrosion occurs. The Ni-base alloy of Patent Literature 8 contains, in mass %, C: not more than 0.03%, Si: 0.01 to 0.5%, Mn: 0.01 to 1.0%, P: not more than 0.03%, S: not more than 0.01%, Cr: not less than 20% and less than 30%, Ni: more than 40% and not more than 50%, Cu: more than 2.0% and not more than 5.0%, Mo: 4.0 to 10%, Al: 0.005 to 0.5%, W: 0.1 to 10%, and N: more than 0.10% and not more than 0.35%, and satisfies a Formula of $0.5Cu+Mo \geq 6.5$ ... (1), with the balance being Fe and impurities, in which a surface Vickers hardness at 500° C. is not less than 350. Patent Literature 8 states that as a result of this, it is possible to ensure corrosion resistance equivalent to that of a Ni-base alloy of a high Mo content such as Hastelloy C22 and Hastelloy C276 in a harsh environment in which temperature is 100 to 500° C. and erosion as well as hydrochloric acid corrosion and/or sulfuric acid corrosion occur, and furthermore, due to high surface hardness, it is possible to prevent occurrence of erosion.

CITATION LIST

Patent Literature

Patent Literature 1: Japanese Patent Application Publication No. 58-210158
Patent Literature 2: Japanese Patent Application Publication No. 58-9924
Patent Literature 3: Japanese Patent Application Publication No. 11-302801
Patent Literature 4: Japanese Patent Application Publication No. 62-158844
Patent Literature 5: Japanese Patent Application Publication No. 62-158845
Patent Literature 6: Japanese Patent Application Publication No. 62-158846
Patent Literature 7: International Application Publication No. WO 2009/119630
Patent Literature 8: Japanese Patent Application Publication No. 2011-63863

Non Patent Literature

Non Patent Literature 1: Koichi Nakajima, et al., "Evaluation method of dislocation density by use of X-ray diffraction", Current Advances in Materials and Processes (CAMP-ISIJ), The Iron and Steel Institute of Japan, 2004, Vol. 17, No. 3, p. 396

Non Patent Literature 2: G. K. Williamson and W. H. Hall, "X-RAY LINE BROADENING FROM FILED ALUMINIUM AND WOLFRAM," Acta Metallurgica, 1953, Vol. 1, No. 1, p. 22-31

Non Patent Literature 3: H. M. Rietveld, "A Profile Refinement Method for Nuclear and Magnetic Structures," Journal of Applied Crystallography, 1969, Vol. 2, p. 65-71

SUMMARY OF INVENTION

Technical Problem

However, even when the technologies disclosed in Patent Literatures 7 and 8 are used, there are cases in which high yield strength, and high resistance to sulfuric acid general corrosion at a high temperature of 250° C. are not obtained.

The object of the present invention is to provide a Cr—Ni alloy having high yield strength and high resistance to sulfuric acid general corrosion at a high temperature of 250° C., and a seamless steel pipe made of the Cr—Ni alloy.

Solution to Problem

A Cr—Ni alloy of the present embodiment has a chemical composition consisting of, in mass %, Si: 0.01 to 0.50%, Mn: 0.01 to 1.00%, Cr: 21.0 to 27.0%, Ni: 40.0 to less than 50.0%, Mo: 4.5 to less than 9.0%, W: 2.0 to 6.0%, Cu: more than 2.0% and not more than 6.0%, Co: 0.01 to 2.00%, one or two kinds selected from the group consisting of Ca and Mg: 0.001 to 0.010% in total, sol. Al: 0.005 to 0.200%, N: 0.01 to 0.20%, one or more kinds selected from the group consisting of Ti, Nb, Zr, and V: 0 to 0.50% in total, REM: 0 to 0.050%, C: not more than 0.030%, P: not more than 0.030%, S: not more than 0.0010%, O: not more than 0.010%, and the balance being Fe and impurities. A dislocation density in the Cr—Ni alloy satisfies the following Formula (1).

$$8.00 \times 10^{14} \leq \rho \leq 2.50 \times 10^{15} + 1.40 \times 10^{14} \times [Cu+Co] \quad (1)$$

Where, in Formula (1), $\rho$ denotes dislocation density $(m^{-2})$, and Cu and Co respectively denote the Cu content (mass %) and Co content (mass %) in the Cr—Ni alloy.

The seamless steel pipe of the present embodiment is made of the above described Cr—Ni alloy.

Advantageous Effects of Invention

The Cr—Ni alloy of the present embodiment has a high yield strength and high resistance to sulfuric acid general corrosion at a high temperature of 250° C.

DESCRIPTION OF EMBODIMENTS

The present inventors have studied on the yield strength and the resistance to sulfuric acid general corrosion of Cr—Ni alloy at 250° C. As a result of that, the following findings have been obtained.

To achieve yield strength which is required in a deep geothermal well, it is effective to introduce dislocation into the Cr—Ni alloy by use of means such as cold working, etc. Specifically, when the contents of Cr and Ni are appropriately adjusted, and the dislocation density is not less than $8.00 \times 10^{14}$ $m^{-2}$, sufficient yield strength can be achieved.

However, it is found that increasing the dislocation density deteriorates the corrosion resistance of the Cr—Ni alloy in a strongly acidic environment such as a harsh geothermal environment in which temperature is as high as 250° C. and which contains a large amount of sulfuric acid. The present inventors investigated the causes thereof in detail. As a result, they have found that when the dislocation density is too high, resistance against general corrosion by sulfuric acid (resistance to sulfuric acid general corrosion) deteriorates in a harsh geothermal environment of 250° C., and therefore the corrosion resistance of Cr—Ni alloy deteriorates. This is considered because dislocations introduced into the Cr—Ni alloy accelerate dissolving reaction of the Cr—Ni alloy in a strongly acidic environment, and the dissolving reaction is further accelerated in a high temperature environment of 250° C.

Accordingly, the present inventors have investigated the relationship between the dislocation density after cold working and the resistance to sulfuric acid general corrosion at a high temperature of 250° C. of the Cr—Ni alloy by adding various alloy elements thereto.

As a result, the present inventors have found that Cu has "softening effect" of making dislocations less likely to be introduced in a Cr—Ni alloy. In other words, when the Cu content is high, it is restricted that excessive dislocations are introduced into the Cr—Ni alloy. Further, Cu improves the corrosion resistance of Cr—Ni alloy against sulfuric acid. This will improve the resistance to sulfuric acid general corrosion of Cr—Ni alloy. The present inventors have further found that Co improves resistance against general corrosion by sulfuric acid.

As so far described, the present inventors have found for the first time that if Cu and Co are contained in a Cr—Ni alloy in appropriate amounts respectively, high resistance to sulfuric acid general corrosion will be achieved even when the dislocation density is increased. Specifically, when the dislocation density in Cr—Ni alloy is not more than $2.50 \times 10^{15} + 1.40 \times 10^{14} \times [Cu+Co]$, high resistance to sulfuric acid general corrosion at 250° C. will be achieved. Where, Cu and Co represented by the above described [Cu+Co] respectively indicate the Cu content (mass %) and the Co content (mass %) in the Cr—Ni alloy.

Conventionally, dislocation density has been studied in relation with strength. Therefore, the relationship between the dislocation density and resistance to sulfuric acid general corrosion, and the relationship between the dislocation density, and the Cu content and Co content have not been clarified.

On the other hand, in the present embodiment, the upper limit of the dislocation density in the Cr—Ni alloy is limited by a relationship between itself and the Cu content and the Co content. As a result of this, it is made possible for the first time to concurrently achieve high yield strength and high resistance to sulfuric acid general corrosion at 250° C. which are required in a deep geothermal well. Therefore, the Cu—Ni alloy of the present embodiment has been completed based on a technical idea which is different from those in the past.

The Cr—Ni alloy of the present embodiment which has been completed based on the above described findings has a chemical composition consisting of in mass %, Si: 0.01 to 0.50%, Mn: 0.01 to 1.00%, Cr: 21.0 to 27.0%, Ni: 40.0 to less than 50.0%, Mo: 4.5 to less than 9.0%, W: 2.0 to 6.0%, Cu: more than 2.0% and not more than 6.0%, Co: 0.01 to 2.00%, one or two kinds selected from the group consisting of Ca and Mg: 0.001 to 0.010% in total, sol. Al: 0.005 to 0.200%, N: 0.01 to 0.20%, one or more kinds selected from the group consisting of Ti, Nb, Zr, and V: 0 to 0.50% in total, REM: 0 to 0.050%, C: not more than 0.030%, P: not more than 0.030%, S: not more than 0.0010%, O: not more than 0.010%, and the balance being Fe and impurities. The dislocation density in the Cr—Ni alloy satisfies the following Formula (1).

$$8.00\times10^{14} \leq \rho \leq 2.50\times10^{15}+1.40\times10^{14}\times[Cu+Co] \tag{1}$$

Where, in Formula (1), ρ denotes dislocation density (m), and Cu and Co respectively denote the Cu content (mass %) and Co content (mass %) in the Cr—Ni alloy.

The Cr—Ni alloy of the present embodiment has an appropriate chemical composition, and a dislocation density satisfying Formula (1). Therefore, the Cr—Ni alloy has high yield strength and high resistance to sulfuric acid general corrosion at a high temperature of 250° C.

Preferably, the content of one or more kinds selected from the group consisting of Ti, Nb, Zr, and V of the above described chemical composition is 0.01 to 0.50% in total.

In this case, the strength and ductility of the Cu—Ni alloy is further improved.

Preferably, the REM content of the above described chemical composition is 0.005 to 0.050%.

In this case, the hot workability of Cr—Ni alloy is improved.

Preferably, the yield strength (0.2% yield stress) of the Cr—Ni alloy is not less than 758 MPa.

Preferably, the yield strength (0.2% yield stress) of the Cr—Ni alloy is not less than 861 MPa.

Preferably, the yield strength (0.2% yield stress) of the Cr—Ni alloy is not less than 965 MPa.

The seamless steel pipe of the present embodiment is made of the above described Cr—Ni alloy.

Hereinafter, the Cr—Ni alloy of the present embodiment will be described in detail.

[Chemical Composition]

The chemical composition of the Cr—Ni alloy of the present embodiment contains the following elements. Reference character "%" regarding each element means, unless otherwise stated, mass %.

Si: 0.01 to 0.50%

Silicon (Si) is an element necessary for deoxidizing the Cr—Ni alloy. When the Si content is less than 0.01%, such effect cannot be achieved. On the other hand, when the Si content is more than 0.50%, the hot workability may deteriorate. Therefore, the Si content is 0.01 to 0.50%. The lower limit of the Si content is preferably 0.05%, and more preferably 0.10%. The upper limit of the Si content is preferably 0.45%, and more preferably 0.40%.

Mn: 0.01 to 1.00%

Manganese (Mn) is an element which is necessary as a deoxidizing and/or desulfurizing agent of the Cr—Ni alloy. When the Mn content is less than 0.01%, such effects cannot be achieved. On the other hand, when the Mn content is more than 1.00%, the hot workability of the Cr—Ni alloy deteriorates. Therefore, the Mn content is 0.01 to 1.00%. The lower limit of the Mn content is preferably 0.05%, and more preferably 0.10%. The upper limit of the Mn content is preferably 0.80%, and more preferably 0.70%.

Cr: 21.0 to 27.0%

Chromium (Cr) is an element which improves resistance to sulfuric acid general corrosion and resistance to stress corrosion cracking. When the Cr content is less than 21.0%, such effects cannot be sufficiently achieved. On the other hand, when the Cr content is more than 27.0%, the hot workability of the Cr—Ni alloy deteriorates. When the Cr content is more than 27.0%, further, a TCP phase represented by the sigma phase becomes likely to be generated so that the resistance to sulfuric acid general corrosion and the resistance to stress corrosion cracking will rather deteriorate. Therefore, the Cr content is 21.0 to 27.0%. The lower limit of the Cr content is preferably 21.2%, more preferably 21.4%, and further preferably 21.6%. The upper limit of the Cr content is preferably 26.8%, more preferably 26.5%, and further preferably 26.0%.

Ni: 40.0 to Less than 50.0%

Nickel (Ni) is an austenite stabilizing element. When the Ni content is less than 40.0%, the corrosion resistance of the Cr—Ni alloy deteriorates. On the other hand, when the Ni content is not less than 50.0%, increase in cost will be caused. Therefore, the Ni content is 40.0 to less than 50.0%. The lower limit of the Ni content is preferably 41.5%, more preferably 43.5%, and further preferably 44.0%. The upper limit of the Ni content is preferably 49.7%, more preferably 49.3%, and further preferably 49.0%.

Mo: 4.5 to Less than 9.0%

Molybdenum (Mo) improves the pitting resistance of the Cr—Ni alloy in an environment in which hydrogen sulfide and chloride ion are present. When the Mo content is less than 4.5%, such effect cannot be achieved. On the other hand, when the Mo content is not less than 9.0%, the hot workability of the Cr—Ni alloy remarkably deteriorates. When the Mo content is not less than 9.0%, which will further cause cost increase. Therefore, the Mo content is 4.5 to less than 9.0%. The lower limit of the Mo content is preferably 4.7%, more preferably 4.8%, and further preferably 5.0%. The upper limit of the Mo content is preferably 8.5%, more preferably less than 8.3%, further preferably 8.2%, and most preferably 8.0%.

W: 2.0 to 6.0%

Tungsten (W), like Mo, improves the pitting resistance of the Cr—Ni alloy in an environment in which hydrogen sulfide and chloride ion are present. When the W content is less than 2.0%, such effect cannot be sufficiently achieved. On the other hand, when the W content is more than 6.0%, the hot workability of the Co—Ni alloy remarkably deteriorates. When the W content is more than 6.0%, which further causes cost increase. Therefore, the W content is 2.0 to 6.0%. The lower limit of the W content is preferably 2.5%, more preferably 2.7%, and further preferably 3.0%. The upper limit of the W content is preferably 5.5%, more preferably 5.0%, and further preferably 4.5%.

Cu: More than 2.0% to not More than 6.0%

Copper (Cu) is an important element for ensuring resistance to sulfuric acid general corrosion in a harsh geothermal environment. Cu remarkably improves the resistance to sulfuric acid general corrosion and the resistance to stress corrosion cracking of the Cr—Ni alloy. When the Cu content is not more than 2.0%, it is not sufficient to ensure the resistance to sulfuric acid general corrosion. On the other hand, when the Cu content is more than 6.0%, the hot workability of Cr—Ni alloy deteriorates. Therefore, the Cu content is more than 2.0% and not more than 6.0%. The lower limit of the Cu content is preferably 2.1%, more preferably 2.3%, and further preferably 2.5%. The upper limit of the Cu content is preferably 4.6%, more preferably 4.3%, and further preferably 4.0%.

Co: 0.01 to 2.00%

Cobalt (Co) is, like Cu, an element to ensure the resistance to sulfuric acid general corrosion in a harsh geothermal environment. When the Co content is less than 0.01%, such effect cannot be sufficiently achieved. On the other hand, when the Co content is more than 2.00%, economical efficiency deteriorates. Therefore, the Co content is 0.01 to 2.00%. The lower limit of the Co content is preferably 0.02%, more preferably 0.04%, and further preferably 0.05%. The upper limit of the Co content is preferably 1.80%, and more preferably 1.60%.

One or Two Kinds Selected from the Group Consisting of Ca and Mg: 0.001 to 0.010% in Total Calcium (Ca) and Magnesium (Mg) improve the hot workability of the Cr—Ni alloy, and also improves the productivity of the Cr—Ni alloy. When a total content of one or two kinds selected from the group consisting of Ca and Mg is less than 0.001%, such effect cannot be achieved. On the other hand, when the total content of one or two kinds selected from the group consisting of Ca and Mg is more than 0.010%, the hot workability of the Cr—Ni alloy rather deteriorates. When the total content of one or two kinds selected from the group consisting of Ca and Mg is more than 0.010%, further, coarse inclusions will be produced, thus deteriorating the resistance to sulfuric acid general corrosion of the Cr—Ni alloy. Therefore, the content of one or two kinds selected from the group consisting of Ca and Mg is 0.001 to 0.010% in total. The upper limit of the total content of one or two kinds selected from the group consisting of Ca and Mg is preferably 0.007%.

It is not necessary that both of Ca and Mg are contained. The chemical composition of the Cr—Ni alloy may contain Ca singly, and may not contain Mg. When Ca is singly contained, the Ca content is 0.001 to 0.010%. When Ca is singly contained, the upper limit of the Ca content is preferably 0.007%. The chemical composition of the Cr—Ni alloy may contain Mg singly, and may not contain Ca. When Mg is contained singly, the Mg content is 0.001 to 0.010%. When Mg is contained singly, the upper limit of the Mg content is preferably 0.007%.

Sol. Al: 0.005 to 0.200%

Aluminum (Al) immobilizes O (Oxygen) in the alloy, and improves the hot workability of the Cr—Ni alloy. On the other hand, when the sol. Al content is more than 0.200%, the hot workability of the Cr—Ni alloy deteriorates. Therefore, the Al content is 0.005 to 0.200% in sol. Al. The lower limit of the Al content in sol. Al is preferably 0.008%. The upper limit of the Al content in sol. Al is preferably 0.160%, and more preferably 0.150%. Note that "sol. Al" means so-called "acid-soluble Al".

N: 0.01 to 0.20%

Nitrogen (N) increases the yield strength (0.2% yield stress) of the Cr—Ni alloy. When the N content is less than 0.01%, such effect cannot be achieved. On the other hand, the N content is more than 0.20%, the hot workability of the Cr—Ni alloy deteriorates due to increase in nitrides. Therefore, the N content is 0.01 to 0.20%. The lower limit of the N content is preferably 0.02%, and more preferably 0.04%. The upper limit of the N content is preferably 0.18%, and more preferably 0.15%.

The balance of the chemical composition of the Cr—Ni alloy according to the present embodiment is Fe and impurities. In other words, the chemical composition of the Cr—Ni alloy according to the present embodiment essentially contains Fe. Where, an impurity in the chemical composition means an element which is introduced from ores and scraps as the raw material, or from a production environment, etc. when the stainless steel material is industrially produced, and which is permitted within a range not adversely affecting the Cr—Ni alloy of the present embodiment.

[Optional Elements]

The chemical composition of the Cr—Ni alloy of the present embodiment may further contain the following optional elements.

One or More Kinds Selected from the Group Consisting of Ti, Nb, Zr, and V: 0 to 0.50% in Total Titanium (Ti), Niobium (Nb), Zirconium (Zr), and Vanadium (V) are all optional elements, and may not be contained. In other words, the total content of one or more kinds selected from the group consisting of Ti, Nb, Zr, and V may be 0%. Each of Ti, Nb, Zr, and V refines crystal grains, thereby improving the strength and ductility of the Cr—Ni alloy. For that purpose, one or more kinds selected from the group consisting of Ti, Nb, Zr, and V may be contained as needed. However, when the total content of one or more kinds selected from the group consisting of Ti, Nb, Zr, and V is more than 0.50%, a large amount of inclusions are produced, rather reducing ductility, and further deteriorating hot workability. Therefore, the content of one or more kinds selected from the group consisting of Ti, Nb, Zr, and V is 0 to 0.50% in total. The lower limit of the total content of one or more kinds selected from the group consisting of Ti, Nb, Zr, and V is preferably 0.01%, more preferably 0.02%, and further preferably 0.04%. The upper limit of the total content of one or more kinds selected from the group consisting of Ti, Nb, Zr, and V is preferably 0.30%.

When one or more kinds selected from the group consisting of Ti, Nb, Zr, and V is contained, Ti, Nb, Zr, or V may be contained singly. When Ti is contained singly, the Ti content is 0 to 0.50%. When Nb is contained singly, the Nb content is 0 to 0.50%. When Zr is contained singly, the Zr content is 0 to 0.50%. When V is contained singly, the V content is 0 to 0.50.

REM: 0 to 0.05%

Rare earth metal (REM) is an optional element, and may not be contained. In other words, the REM content may be 0%. REM improves the hot workability of the Cr—Ni alloy. For that purpose, it may be contained as needed. On the other hand, when the REM content is more than 0.050%, the resistance to sulfuric acid general corrosion of the Cr—Ni alloy deteriorates. Therefore, the REM content is 0 to 0.050%. The lower limit of the REM content is preferably 0.005%, more preferably 0.008%, and further preferably 0.010%. The upper limit of the REM content is preferably 0.030%. Where, REM means 17 elements including those from Lanthanum (La) whose element number is 57 to Lutetium (Lu) whose element number is 71 in the periodic table, supplemented with Yttrium (Y) and Scandium (Sc). The REM content means the total content of these elements. Industrially, REM may be added as misch metal.

[Impurity Elements]

The chemical composition of the Cr—Ni alloy of the present embodiment contains the following elements as impurities. The contents of these elements are limited for the following reasons.

C: Not More than 0.030%

Carbon (C) is an impurity inevitably contained in the Cr—Ni alloy. Therefore, the lower limit of the C content is more than 0%. When the C content is more than 0.030%, stress corrosion cracking associated with intergranular fracture due to precipitation of $M_{23}C_6$ type carbide ("M" refers to an alloy element such as Cr, Mo, and/or Fe) becomes likely to occur. Therefore, the C content is not more than 0.030%. The upper limit of the C content is preferably 0.025%, and more preferably 0.020%. On the other hand, reducing the C content to an extreme will lead to increase in production cost due to decarburization. Therefore, the lower limit of the C content is preferably 0.0001%.

P: Not More than 0.030%

Phosphorous (P) is an impurity inevitably contained in the Cr—Ni alloy. Therefore, the lower limit of the P content is more than 0%. P remarkably deteriorates the hot workability and stress corrosion cracking resistance of the Cr—Ni alloy. Therefore, the P content is not more than 0.030%. The upper limit of the P content is preferably 0.025%, and more preferably 0.020%. On the other hand, reducing the P content to an extreme will lead to increase in production cost due to dephosphorization. Therefore, the lower limit of the P content is preferably 0.0001%.

S: Not More than 0.0010%

Sulfur (S) is an impurity inevitably contained in the Cr—Ni alloy. Therefore, the lower limit of the S content is more than 0%. S, like P, remarkably deteriorates the hot workability of the Cr—Ni alloy. In the viewpoint of restricting the deterioration of hot workability, the S content is preferably as low as possible. Therefore, the S content is not more than 0.0010%. The upper limit of the S content is preferably 0.0008%. On the other hand, reducing the S content to an extreme will lead to increase in production cost due to desulfurization. Therefore, the lower limit of the S content is preferably 0.0001%.

O: Not More than 0.010%

Oxygen (O) is an impurity inevitably contained in the Cr—Ni alloy. Therefore, the lower limit of the O content is more than 0%. O remarkably deteriorates the hot workability of the Cr—Ni alloy. Therefore, the O content is not more than 0.010%. The O content is preferably as low as possible. On the other hand, reducing the O content to an extreme will lead to increase in production cost due to deoxidization. Therefore, the lower limit of the O content is preferably 0.0001%.

[Microstructure]

The microstructure of the Cr—Ni alloy of the present embodiment is an austenite single phase.

[Dislocation Density]

The dislocation density in the Cr—Ni alloy satisfies Formula (1).

$$8.00 \times 10^{14} \leq \rho \leq 2.50 \times 10^{15} + 1.40 \times 10^{14} \times [Cu+Co] \quad (1)$$

Where, in Formula (1), $\rho$ denotes dislocation density $(m^{-2})$, and Cu and Co respectively denote the Cu content (mass %) and Co content (mass %) in the Cr—Ni alloy.

In a Cr—Ni alloy having the above described chemical composition, when the dislocation density $\rho$ is less than $8.00 \times 10^{14}$ $m^{-2}$, sufficient yield strength (0.2% yield stress) suitable for use in a deep geothermal well cannot be achieved. On the other hand, dislocation accelerates dissolving reaction of the Cr—Ni alloy in a strongly acidic environment of 250° C. For that reason, when the dislocation density $\rho$ is too high, the resistance to sulfuric acid general corrosion of the Cr—Ni alloy deteriorates. Specifically, when the dislocation density $\rho$ is more than $\{2.50 \times 10^{15} + 1.40 \times 10^{14} \times [Cu+Co]\}$ $m^{-2}$, the resistance to sulfuric acid general corrosion in a strongly acidic environment, such as a harsh geothermal environment, whose temperature is not less than 250° C., and which contains a large amount of sulfuric acid, deteriorates. Therefore, when the dislocation density in the Cr—Ni alloy satisfies Formula (1), it is possible to concurrently achieve sufficiently high yield strength and high resistance to sulfuric acid general corrosion at a high temperature of 250° C.

The lower limit of the dislocation density $\rho$ is preferably $1.60 \times 10^{15}$, more preferably $1.70 \times 10^{15}$ and further preferably $1.80 \times 10^{15}$. The upper limit of the dislocation density $\rho$ is preferably $2.40 \times 10^{15} + 1.40 \times 10^{14} \times [Cu+Co]$, more preferably $2.25 \times 10^{15} + 1.40 \times 10^{14} \times [Cu+Co]$, and further preferably $2.15 \times 10^{15} + 1.40 \times 10^{14} \times [Cu+Co]$.

[Measurement Method of Dislocation Density]

The dislocation density in the Cr—Ni alloy is measured by the following method. First, a test specimen having a length and width of 20 mm each and a thickness of 2 mm is cut out from a central portion in the thickness direction (in the case of a plate, a central portion of the thickness of the plate; and in the case of a pipe, a central portion of the wall thickness of the pipe) of the Cr—Ni alloy. Next, the surface of the test specimen is subjected to electrolytic polishing at 10° C. with 10% perchloric acid-acetic acid solution as the electrolyte. The test specimen after electrolytic polishing is used to measure the dislocation density. The measurement of dislocation density is performed by using an evaluation method based on the Williamson-Hall method described in Non Patent Literature 2, which is proposed by Nakajima et al., in Patent Literature 1. Specifically, an X-ray diffraction profile is measured by a measurement apparatus: Rint-2500 supplied by Rigaku Corporation; a cathode tube: a Co tube; a profile: θ-2θ diffraction method, and scan range: 40° to 130° in 2θ. Then, fitting is performed on each diffraction of {111} plane, {220} plane, and {311} plane of FCC crystal structure by using the Rietveld method described in Non Patent Literature 3. By using obtained half-value width, strain ε is determined. Further, dislocation density $\rho$ $(m^{-2})$ is determined by calculating the following Formula (2) represented by strain ε and the Burgers vector b.

$$\rho = 14.4\varepsilon^2/b^2 \quad (2)$$

Note that for measuring profile resulting from the measurement apparatus, a test specimen which has been solution treated at 1100° C. and then water cooled is used since the dislocation density is considered to be very low in such test specimen. Moreover, a value of $0.2545 \times 10^{-9}$ m is used as the above described Burgers vector b.

[Yield Strength]

The yield strength required in a deep geothermal well is, for example, not less than 758 MPa. Therefore, the yield strength of the Cr—Ni alloy of the present embodiment is preferably not less than 758 MPa. In this case, it can stably withstand a high underground pressure in a deep geothermal well. The yield strength of the Cr—Ni alloy is preferably not less than 861 MPa. and more preferably not less than 965 MPa. The upper limit of the yield strength is preferably 1175 MPa, more preferably 1103 MPa. and further preferably 1000 MPa.

[Measurement Method of Yield Strength]

The yield strength is supposed to be 0.2% yield stress determined by a method conforming to JIS Z2241 (2011). Two round bar tensile test specimens are sampled, each of which has a parallel portion of 6 mm in diameter and a gauge length of 40 mm. The sampling direction of the round bar tensile test specimen is the direction of rolling. For sampled round bar tensile test specimen, tensile test is performed at room temperature by a method conforming to JIS Z2241 (2011) to determine yield strength (0.2% yield stress).

[Shape of Cr—Ni Alloy]

The shape of the Cr—Ni alloy of the present embodiment is not particularly limited. The Cr—Ni alloy may be, for example, an alloy pipe, an alloy plate, an alloy bar, or a wire material. The Cr—Ni alloy of the present embodiment can be suitably used as a seamless steel pipe.

The Cr—Ni alloy of the present embodiment excels in the resistance to sulfuric acid general corrosion. Therefore, it can be suitably used for deep geothermal wells. The Cr—Ni alloy of the present embodiment also excels in stress corrosion cracking resistance (SCC resistance). Therefore, it may also be used for oil well.

[Production Method]

The Cr—Ni alloy of the present embodiment can be produced by, for example, the following method. Hereinafter, a production method when producing a seamless steel pipe will be described as an example. However, the production method of the present embodiment will not be limited to the case of producing the seamless steel pipe.

First, a material having the above described chemical composition is prepared. Specifically, molten metal is produced by using an electric furnace, an AOD furnace, or a VOD furnace, and its chemical composition is adjusted. When desulfurization processing is performed by REM combined with Ca and/or Mg, it is desirable that REM and Ca and/or Mg are added after sufficient deoxidization is performed by using Al, etc.

Next, material is produced from the molten metal of which chemical composition has been adjusted. The material may be a slab, bloom, or billet produced by a continuous casting process (including round continuous casting). Further, the material may be a billet which is produced by hot working of an ingot produced by an ingot making process. The material may also be a billet which is produced by hot working of a slab or bloom.

Next, the material is loaded into a heating furnace or a soaking pit to be heated. The heating temperature is, for example, 850 to 1300° C. The heated material is subjected to hot working. For example, the Mannesmann method is performed as the hot working. Specifically, the material is piercing-rolled by a piercing machine to be formed into a hollow shell. Successively, the hollow shell is subjected to elongation rolling and diameter adjusting rolling by a mandrel mill and a sizing mill to produce a seamless steel pipe. Hot extrusion may be performed, or hot forging may also be performed as the hot working. The temperature of the hot working is 800 to 1300° C. Note that when the material is processed into a plate, it may be processed into a plate or coil shape by hot rolling.

Next, the hollow shell after hot working is subjected to a solution heat treatment. The temperature of the solution heat treatment is, for example, 1000 to 1250° C. The time for the solution heat treatment is, for example, 45 minutes to 2 hours.

Further, the hollow shell is subjected to cold working such that the dislocation density $\rho$ satisfies the above described Formula (1). The cold working may be, for example, cold drawing or Pilger rolling, etc. The cold working may be performed once or multiple times.

When cold working is performed multiple times, intermediate heat treatment may be performed between two cold working processes. For example, intermediate heat treatment is performed after cold working, and thereafter cold working may be performed one or more times. In the Cr—Ni alloy of the present embodiment, the upper limit of the dislocation density $\rho$ is limited depending on the Cu content and the Co content. When the Cu content and the Co content are high, even if the dislocation density $\rho$ is increased, excellent resistance to sulfuric acid general corrosion can be achieved. On the other hand, when the Cu content and the Co content are low, the resistance to sulfuric acid general corrosion will deteriorate unless the dislocation density $\rho$ is limited to a fixed value. To make the dislocation density $\rho$ not more than the upper limit specified by Formula (1), for example, the reduction of area (%) during cold working may be made not more than the value (%) obtained from Formula (3). Formula (3) is $8.8 \times [Cu+Co]+12.5$ . . . (3). This makes it possible to control the upper limit of the dislocation density $\rho$ to be within the range of Formula (1) under the condition having the chemical composition of the present application. The lower limit of the reduction of area during cold working is for example 30%. When intermediate heat treatment is performed after cold working, and thereafter cold working is further performed one or more times, the reduction of area after the intermediate heat treatment is, for example, not less than 30%, and not more than $\{8.8 \times [Cu+Co]+12.5\}\%$. The lower limit of the reduction of area is preferably 35%. In this case, the dislocation density will further increase.

To control the microstructure of the material, heat treatment at not more than 600° C. may be performed after cold working is performed. This causes C and N in the material to be diffused, thereby making dislocations hard to move. As a result, the anisotropy of yield strength can be reduced. If the temperature of the heat treatment is more than 600° C., the yield strength will be reduced. This is considered because the temperature is too high, and therefore dislocations join together to be extinct. In the production method of the Cr—Ni alloy of present disclosure, solution treatment after final cold working is not performed. After the heat treatment, descaling (oxide scale formed on the surface is removed by shot blasting pickling etc.) may be performed. Finally, washing may be performed to remove foreign matter on the surface. By the above described processes, it is possible to produce a seamless steel pipe.

Examples

Alloys having the chemical compositions shown in Table 1 were melted by a vacuum high frequency melting furnace to cast an ingot of 30 kg.

TABLE 1

| | Chemical composition (mass %) (Balance being Fe and impurities) | | | | | | | | | |
|---|---|---|---|---|---|---|---|---|---|---|
| Alloy | C | Si | Mn | P | S | Cr | Ni | Mo | W | Cu |
| A | 0.011 | 0.19 | 0.33 | 0.012 | 0.0004 | 23.5 | 46.3 | 6.8 | 3.9 | 2.9 |
| B | 0.012 | 0.12 | 0.17 | 0.015 | 0.0007 | 21.1 | 45.7 | 5.9 | 4.1 | 3.4 |
| C | 0.016 | 0.16 | 0.67 | 0.009 | 0.0005 | 25.7 | 48.8 | 7.7 | 3.2 | 2.4 |
| D | 0.011 | 0.32 | 0.26 | 0.011 | 0.0006 | 21.8 | 42.7 | 5.1 | 4.4 | 3.8 |
| E | 0.009 | 0.37 | 0.55 | 0.013 | 0.0008 | 24.3 | 49.4 | 5.6 | 3.6 | 2.7 |
| F | 0.013 | 0.13 | 0.18 | 0.021 | 0.0009 | 22.2 | 45.1 | 7.8 | 4.7 | 3.6 |
| G | 0.015 | 0.22 | 0.51 | 0.011 | 0.0003 | 21.5 | 49.8 | 8.6 | 5.1 | 4.2 |
| H | 0.016 | 0.33 | 0.43 | 0.013 | 0.0004 | 22.4 | 48.8 | 8.3 | 5.6 | 4.7 |
| I | 0.007 | 0.15 | 0.37 | 0.014 | 0.0005 | 25.8 | 46.2 | 7.8 | 3.4 | 3.8 |

TABLE 1-continued

| | | | | | | | | | | |
|---|---|---|---|---|---|---|---|---|---|---|
| J | 0.010 | 0.18 | 0.27 | 0.011 | 0.0006 | 22.3 | 48.5 | 5.3 | 3.8 | 2.9 |
| K | 0.017 | 0.23 | 0.36 | 0.018 | 0.0004 | 26.3 | 47.6 | 6.2 | 4.1 | 2.2 |
| L | 0.008 | 0.24 | 0.45 | 0.016 | 0.0008 | 23.7 | 45.9 | 5.9 | 4.3 | 3.5 |
| M | 0.012 | 0.16 | 0.28 | 0.008 | 0.0006 | 23.1 | 49.4 | 8.1 | 4.8 | 4.1 |
| N | 0.009 | 0.19 | 0.32 | 0.009 | 0.0009 | 26.6 | 48.5 | 6.8 | 4.2 | 3.3 |
| O | 0.012 | 0.17 | 0.28 | 0.012 | 0.0004 | 24.9 | 40.8 | 5.9 | 3.2 | 2.8 |
| P | 0.014 | 0.25 | 0.51 | 0.016 | 0.0007 | 26.9 | 47.3 | 7.1 | 3.5 | 3.9 |
| Q | 0.015 | 0.26 | 0.62 | 0.017 | 0.0006 | 22.7 | 43.8 | 6.2 | 3.4 | 2.4 |
| R | 0.007 | 0.23 | 0.68 | 0.015 | 0.0005 | 21.3 | 48.6 | 8.8 | 4.6 | 4.4 |
| S | 0.009 | 0.18 | 0.37 | 0.015 | 0.0005 | 21.8 | 45.3 | 5.7 | 2.9 | 1.5 |
| T | 0.014 | 0.22 | 0.45 | 0.018 | 0.0007 | 22.3 | 47.2 | 5.1 | 3.8 | 2.3 |

Chemical composition (mass %) (Balance being Fe and impurities)

| Alloy | Co | Ca, Mg | sol.Al | N | O | Ti, Nb, Zr, V | REM |
|---|---|---|---|---|---|---|---|
| A | 0.58 | 0.002Ca | 0.090 | 0.11 | 0.005 | — | — |
| B | 0.07 | 0.004Mg | 0.030 | 0.09 | 0.008 | — | — |
| C | 1.48 | 0.005Ca | 0.010 | 0.12 | 0.004 | — | — |
| D | 0.15 | 0.003Mg | 0.140 | 0.05 | 0.007 | — | — |
| E | 1.57 | 0.001Ca, 0.003Mg | 0.110 | 0.14 | 0.009 | — | — |
| F | 0.34 | 0.002Ca, 0.004Mg | 0.040 | 0.07 | 0.006 | — | — |
| G | 0.08 | 0.004Ca | 0.180 | 0.03 | 0.009 | — | — |
| H | 1.05 | 0.002Ca, 0.004Mg | 0.110 | 0.16 | 0.004 | — | — |
| I | 0.56 | 0.005Ca | 0.050 | 0.09 | 0.007 | 0.02Ti, 0.04Nb | — |
| J | 0.24 | 0.003Ca | 0.130 | 0.11 | 0.008 | 0.02Zr, 0.10V | — |
| K | 1.39 | 0.004Ca, 0.001Mg | 0.070 | 0.07 | 0.009 | 0.08V | — |
| L | 0.87 | 0.006Ca | 0.120 | 0.09 | 0.007 | — | 0.017Nd |
| M | 0.38 | 0.003Mg | 0.007 | 0.14 | 0.006 | — | 0.013Ce |
| N | 0.76 | 0.002Mg | 0.009 | 0.12 | 0.006 | 0.12V | 0.014La |
| O | 0.28 | 0.003Ca, 0.002Mg | 0.030 | 0.08 | 0.004 | 0.06Zr | 0.015Ce |
| P | 0.57 | 0.003Ca | 0.020 | 0.07 | 0.009 | 0.03Nb | 0.027Y |
| Q | 1.01 | 0.004Mg | 0.060 | 0.09 | 0.008 | 0.08Ti | 0.011Nd |
| R | 1.27 | 0.003Ca | 0.170 | 0.07 | 0.005 | 0.15V | 0.016Y |
| S | 0.11 | 0.002Ca | 0.050 | 0.11 | 0.005 | — | — |
| T | <0.001 | 0.004Mg | 0.090 | 0.07 | 0.006 | — | — |

Alloys A to R in Table 1 were alloys each having an appropriate chemical composition. On the other hand, Alloys S and T were alloys each having a chemical composition deviating from the condition specified in the present invention.

After being subjected to soaking treatment at 1200° C. for 3 hours, each ingot was processed by hot forging into a rectangular bar having a cross section of 50 mm×100 mm. After further being reheated at 1200° C. for one hour, each rectangular bar was subjected to hot rolling to obtain a plate having a thickness of 17 m. Thereafter, solution heat treatment was performed at 1100° C. for one hour, and successively water cooling was performed to obtain a single phase structure of austenite.

Next, a portion of the plate after water cooling treatment was subjected to cold rolling to obtain a plate of each test number. Concerning Alloy A, three kinds of plates respectively having thicknesses of 16.2 mm (a reduction of area of 4.7%), 11.9 mm (a reduction of area of 30%), and 8.5 mm (a reduction of area of 50%) were fabricated. Concerning Alloy H, two kinds of plates respectively having thicknesses of 11.9 mm (a reduction of area of 30%) and 10.2 mm (a reduction of area of 40%) were fabricated. Further, concerning Alloys B, D, E, J, and O, two kinds of plates respectively having thicknesses of 11.9 mm (a reduction of area of 30%) and 11.1 mm (a reduction of area of 35%) were fabricated. Concerning other alloys, a plate having a thickness of 11.9 mm (a reduction of area of 30%) was fabricated.

[Measurement of Dislocation Density]

The dislocation density of the plate of each test number was measured by the above described method. The results are shown in Table 2.

[Tensile Test]

The plate of each test number was subjected to tensile test. Two round bar tensile test specimens, which each had a parallel portion of 6 mm in diameter and a gauge length of 40 mm, were sampled from each plate. The sampling direction of the round bar tensile test specimen was the direction of rolling. The sampled round bar tensile test specimens were subjected to tensile test at the room temperature, to determine yield strength (0.2% yield stress). Each yield strength listed in Table 2 is an arithmetic mean value of yield strength of two test specimens. In the investigation of tensile properties, when the mean value of the yield strength of the two test specimens was not less than 758 MPa, it was judged that yield strength was sufficiently high.

[Evaluation Test of Resistance to Sulfuric Acid General Corrosion]

Two corrosion test specimens each having a length of 40 mm, a width of 10 mm, and a thickness of 3 mm were sampled from the plate of each test number. Each corrosion test specimen had a hole having a diameter of 3 mm for hanging the test specimen from a fixture. The weight of the corrosion test specimen before test was measured. The corrosion test specimen was immersed in a test solution in an autoclave which is adjusted to the following test conditions.

Test Conditions

Test solution: 0.01 mol/L $H_2SO_4$+1.7 mass % NaCl

Test gas: 0.1 bar $H_2S$+5 bar $CO_2$

Test temperature: 250° C.

Test time: 360 hours

The weight of the corrosion test specimen after elapse of the test time was measured. A corrosion loss of each test specimen was determined based on the amount of change in the weight of the corrosion test specimen before and after the test. From the obtained corrosion loss, a corrosion rate (mm/y) of the plate of each test number was calculated. A value of 0.10 mm/y of this corrosion rate was supposed to be a target value of the resistance to sulfuric acid general corrosion. When the corrosion rate was not more than 0.10 mm/y, it was judged that the resistance to sulfuric acid general corrosion is satisfactory. Results are shown in Table 2.

[Stress Corrosion Cracking Resistance Test]

From the plate of each test number, four low-strain-rate tensile test specimens were sampled, which had a parallel portion of 3.81 mm in diameter, and a length of 25.4 mm, in conformance with the low strain rate tensile test method specified in NACE TM0198. Specifically, a test specimen was sampled from the plate of each test number such that the parallel portion was oriented in parallel with the direction of rolling. Then low strain rate tensile test according to NACE TM0198 was conducted to evaluate the stress corrosion cracking resistance. The test environment had two conditions: an atmospheric environment and an environment which simulated an oil well environment (test condition to be described later).

For one test specimen out of the four test specimens, the values of rupture ductility and rupture areal reduction (hereinafter, referred to as a "reference value of rupture ductility", and a "reference value of rupture areal reduction") were determined by a tensile test in an atmospheric environment. For other three test specimens, the values of rupture ductility and rupture areal reduction were determined by a tensile test in an environment simulating an oil well environment (hereinafter, referred to as a "comparison value of rupture ductility" and a "comparison value of rupture areal reduction"). In other words, in the present embodiment, for each cold rolled material, one reference value of rupture ductility, three comparison values of rupture ductility, one reference value of rupture areal reduction, and three comparison values of rupture areal reduction were determined.

Then, for each cold rolled material, differences between the reference value of rupture ductility and three comparison values of rupture ductility were determined respectively (hereinafter, each difference is referred to as "difference of rupture ductility"). Similarly, differences between the reference value of rupture areal reduction and three comparison values of rupture areal reduction were determined respectively (hereinafter, each difference is referred to as "difference of rupture areal reduction"). In this evaluation, a target of the stress corrosion cracking resistance was set such that all of the "differences of rupture ductility" were not more than 20% of the "reference value of rupture ductility", and all of the "differences of rupture areal reduction" were not more than 20% of the "reference value of rupture areal reduction". Then, when the above described targets were achieved, it was judged that stress corrosion cracking resistance was excellent, and a reference character "○" was marked on the column of SCC resistance test in Table 2. On the other hand, when the above described target was not achieved, a reference character "x" was marked.

Test Conditions

Test solution: 25% NaCl+0.5% $CH_3COOH$

Test gas: 6.89 MPa $H_2S$

Test temperature: 204° C.

Strain rate: $4.0 \times 10^{-6}$/s

TABLE 2

| Test No. | Alloy | Formula (3) (%) | Reduction of area (%) | Upper limit value of Formula (1) ($\times 10^{15}$ m$^{-2}$) | Dislocation density ($\times 10^{15}$ m$^{-2}$) | Yield strength (MPa) | Corrosion rate (mm/y) | SCC resistance test |
|---|---|---|---|---|---|---|---|---|
| 1 | A | 43 | 30 | 2.99 | 2.14 | 882 | 0.031 | ○ |
| 2 | B | 43 | 30 | 2.99 | 1.93 | 841 | 0.044 | ○ |
| 3 | C | 47 | 30 | 3.04 | 2.22 | 899 | 0.025 | ○ |
| 4 | D | 47 | 30 | 3.05 | 1.56 | 762 | 0.042 | ○ |
| 5 | E | 50 | 30 | 3.10 | 1.62 | 774 | 0.057 | ○ |
| 6 | F | 47 | 30 | 3.05 | 2.66 | 978 | 0.006 | ○ |
| 7 | G | 50 | 30 | 3.10 | 2.89 | 1017 | 0.007 | ○ |
| 8 | H | 63 | 30 | 3.31 | 2.92 | 1023 | 0.004 | ○ |
| 9 | I | 51 | 30 | 3.11 | 2.32 | 917 | 0.014 | ○ |
| 10 | J | 40 | 30 | 2.94 | 1.64 | 778 | 0.068 | ○ |
| 11 | K | 44 | 30 | 3.00 | 2.05 | 865 | 0.055 | ○ |
| 12 | L | 51 | 30 | 3.11 | 2.04 | 863 | 0.036 | ○ |
| 13 | M | 52 | 30 | 3.13 | 2.72 | 989 | 0.008 | ○ |
| 14 | N | 48 | 30 | 3.07 | 2.36 | 924 | 0.017 | ○ |
| 15 | O | 40 | 30 | 2.93 | 1.82 | 817 | 0.071 | ○ |
| 16 | P | 52 | 30 | 3.13 | 2.42 | 935 | 0.013 | ○ |
| 17 | Q | 43 | 30 | 2.98 | 1.92 | 838 | 0.059 | ○ |
| 18 | R | 62 | 30 | 3.29 | 2.80 | 1002 | 0.003 | ○ |
| 19 | H | 63 | 40 | 3.31 | 3.20 | 1068 | 0.006 | ○ |
| 20 | B | 43 | 35 | 2.99 | 2.28 | 910 | 0.048 | ○ |
| 21 | D | 47 | 35 | 3.05 | 1.88 | 831 | 0.046 | ○ |
| 22 | E | 50 | 35 | 3.10 | 1.94 | 843 | 0.063 | ○ |
| 23 | J | 40 | 35 | 2.94 | 1.96 | 847 | 0.075 | ○ |
| 24 | O | 40 | 35 | 2.93 | 2.16 | 886 | 0.078 | ○ |
| 25 | A | 43 | 4.7 | 2.99 | 0.38 | 401 | 0.027 | ○ |
| 26 | A | 43 | 50 | 2.99 | 3.65 | 1137 | 0.160 | x |
| 27 | S | 27 | 30 | 2.73 | 1.60 | 771 | 0.310 | x |
| 28 | T | 33 | 30 | 2.82 | 1.55 | 759 | 0.190 | x |

[Evaluation Results]

Referring to Tables 1 and 2, the chemical compositions of Test No. 1 to 24 were appropriate, and the dislocation densities satisfied Formula (1). As a result of that, each plate of Test Nos. 1 to 24 showed a yield strength of not less than 758 MPa, and thus exhibited a sufficient yield strength for application to deep geothermal wells. Each plate of Test Nos. 1 to 24 showed a corrosion rate of not more than 0.10 mm/y, thus exhibiting excellent resistance to sulfuric acid general corrosion at 250° C. Further, each plate of Test Nos. 1 to 24 showed no cracking in the stress corrosion cracking test, and therefore was suitably applicable not only to geothermal wells, but also to oil wells.

On the other hand, the plate of Test No. 25 had a dislocation density of $0.38 \times 10^{15}$ m$^{-2}$, and thus did not satisfy Formula (1). For that reason, the yield strength of the plate of Test No. 25 was 401 MPa, and thus not exhibiting sufficient yield strength.

The plate of Test No. 26 had a dislocation density of $3.65 \times 10^{15}$ m$^{-2}$, and thus did not satisfy Formula (1). For that reason, the corrosion rate of the plate of Test No. 26 was 0.160 mm/y, thus exhibiting poor resistance to sulfuric acid general corrosion.

In the plate of Test No. 27, the Cu content of the used alloy was too low. For that reason, the plate of Test No. 27 showed a corrosion rate of 0.310 mm/y, thus exhibiting poor resistance to sulfuric acid general corrosion.

In the plate of Test No. 28, the Co content of the used alloy was too low. For that reason, the plate of Test No. 28 showed a corrosion rate of 0.190 mm/y, thus exhibiting poor resistance to sulfuric acid general corrosion.

So far, embodiments of the present invention have been described. However, the above described embodiments are merely examples for practicing the present invention. Therefore, the present invention will not be limited to the above described embodiments, and can be practiced by appropriately modifying the above described embodiments within a range not departing from the spirit thereof.

INDUSTRIAL APPLICABILITY

The Cr—Ni alloy of the present embodiment can be applied to geothermal wells. The Cr—Ni alloy of the present embodiment may also be used for oil wells.

The invention claimed is:

1. A Cr—Ni alloy, comprising a chemical composition consisting of, in mass %,
Si: 0.01 to 0.50%,
Mn: 0.01 to 1.00%,
Cr: 21.0 to 27.0%,
Ni: 40.0 to less than 50.0%,
Mo: 4.5 to less than 9.0%,
W: 2.0 to 6.0%,
Cu: more than 2.0% and not more than 6.0%,
Co: 0.01 to 2.00%,
one or two kinds selected from the group consisting of Ca and Mg: 0.001 to 0.010% in total,
sol. Al: 0.005 to 0.200%,
N: 0.01 to 0.20%,
one or more kinds selected from the group consisting of Ti, Nb, Zr, and V: 0 to 0.50% in total,
REM: 0 to 0.050%,
C: not more than 0.030%,
P: not more than 0.030%,
S: not more than 0.0010%,
O: not more than 0.010%, and
the balance being Fe and impurities, wherein a dislocation density in the Cr—Ni alloy satisfies the following Formula (1):

$$8.00 \times 10^{14} \leq \rho \leq 2.50 \times 10^{15} + 1.40 \times 10^{14} \times [Cu+Co] \quad (1)$$

where, in Formula (1), ρ denotes dislocation density (m$^{-2}$), and Cu and Co respectively denote the Cu content (mass %) and Co content (mass %) in the Cr—Ni alloy.

2. The Cr—Ni alloy according to claim 1, wherein the content of one or more kinds selected from the group consisting of Ti, Nb, Zr, and V of the chemical composition is 0.01 to 0.50% in total.

3. The Cr—Ni alloy according to claim 1, wherein the REM content of the chemical composition is 0.005 to 0.050%.

4. The Cr—Ni alloy according to claim 2, wherein the REM content of the chemical composition is 0.005 to 0.050%.

5. The Cr—Ni alloy according to claim 1, wherein the yield strength (0.2% yield stress) is not less than 758 MPa.

6. The Cr—Ni alloy according to claim 1, wherein the yield strength (0.2% yield stress) is not less than 861 MPa.

7. The Cr—Ni alloy according to claim 1, wherein the yield strength (0.2% yield stress) is not less than 965 MPa.

8. A seamless steel pipe, consisting of the Cr—Ni alloy according to claim 1.

* * * * *